US009698707B2

(12) United States Patent
Monfray et al.

(10) Patent No.: US 9,698,707 B2
(45) Date of Patent: Jul. 4, 2017

(54) DEVICE FOR CONVERTING THERMAL POWER INTO ELECTRIC POWER

(71) Applicants: STMicroelectronics (Crolles 2) SAS, Crolles (FR); Commissariat A L'Energie Atomique et aux Energies Alternatives, Paris (FR)

(72) Inventors: Stephane Monfray, Eybens (FR); Arthur Arnaud, Poisy (FR); Thomas Skotnicki, Crolles-Montfort (FR); Onoriu Puscasu, Grenoble (FR); Sebastien Boisseau, Grenoble (FR)

(73) Assignees: STMICROELECTRONICS (CROLLES 2) SAS, Crolles (FR); Commissariat A L'Energie Atomique et aux Energies Alternatives, Paris (FR)

( * ) Notice: Subject to any disclaimer, the term of this patent is extended or adjusted under 35 U.S.C. 154(b) by 543 days.

(21) Appl. No.: 14/455,110

(22) Filed: Aug. 8, 2014

(65) Prior Publication Data
US 2015/0042205 A1 Feb. 12, 2015

(30) Foreign Application Priority Data
Aug. 9, 2013 (FR) ..................... 13 57913

(51) Int. Cl.
*H02K 11/00* (2016.01)
*H02N 10/00* (2006.01)
*F03G 7/06* (2006.01)
*H02N 1/08* (2006.01)
*H02N 2/18* (2006.01)

(52) U.S. Cl.
CPC .............. *H02N 10/00* (2013.01); *F03G 7/06* (2013.01); *H02N 1/08* (2013.01); *H02N 2/18* (2013.01); *Y10T 29/4913* (2015.01)

(58) Field of Classification Search
CPC . H02N 1/08; H02N 2/18; H02N 10/00; F03G 7/06; Y10T 29/4913
USPC ................... 310/303, 306, 307, 339; 29/832
IPC ...................................................... H02N 10/00
See application file for complete search history.

(56) References Cited

U.S. PATENT DOCUMENTS

| 5,909,078 A * | 6/1999 | Wood ................... B81B 3/0024 310/306 |
| 6,161,382 A * | 12/2000 | Brotz ....................... F03G 7/06 310/307 |
| 6,876,482 B2 * | 4/2005 | DeReus ............... B81B 3/0024 200/181 |
| 6,882,264 B2 * | 4/2005 | Cunningham ....... B81B 3/0024 257/E27.112 |

(Continued)

FOREIGN PATENT DOCUMENTS

JP    2008106830 A    5/2008

OTHER PUBLICATIONS

Arnaud et al, "Piezoelectric and electrostatic bimetal-based thermal energy harvesters", PowerMEMS 2013, Dec. 3-6, 2013.*

(Continued)

*Primary Examiner* — John K Kim
(74) *Attorney, Agent, or Firm* — Gardere Wynne Sewell LLP

(57) ABSTRACT

A device for converting thermal power into electric power includes many conversion cells arranged inside and on top of a substrate. Each conversion cell includes a curved bimetal strip and first and second diodes coupled to the bimetal strip. The diodes are arranged in a semiconductor region of the substrate.

20 Claims, 4 Drawing Sheets

(56) References Cited

U.S. PATENT DOCUMENTS

| | | | | |
|---|---|---|---|---|
| 8,227,955 B1* | 7/2012 | Mitchell | ................ | H02N 10/00 |
| | | | | 310/328 |
| 8,492,958 B2* | 7/2013 | Skotnicki | ................. | H02N 2/18 |
| | | | | 310/307 |
| 8,552,617 B2* | 10/2013 | Lim | ....................... | H01L 37/02 |
| | | | | 310/306 |
| 8,674,588 B2* | 3/2014 | Kurihara | ................ | H01L 35/32 |
| | | | | 310/306 |
| 8,743,921 B2* | 6/2014 | Yu | ....................... | H01L 25/167 |
| | | | | 372/34 |
| 8,878,418 B2* | 11/2014 | Descure | ................... | H02N 2/18 |
| | | | | 310/306 |
| 2011/0095646 A1* | 4/2011 | Skotnicki | ................ | H02N 2/18 |
| | | | | 310/306 |
| 2012/0176000 A1* | 7/2012 | Mitchell | ................. | H02N 2/18 |
| | | | | 310/307 |
| 2015/0042205 A1* | 2/2015 | Monfray | ............... | H02N 10/00 |
| | | | | 310/307 |

OTHER PUBLICATIONS

Boisseau et al, "Self-starting power management circuits for piezo-electric and electret-based electrostatic mechanical energy harvesters", PowerMEMS 2013, Dec. 3-6, 2013.*

INPI Search Report and Written Opinion for FR 1357913 dated Mar. 19, 2014 (10 pages).

Boisseau S et al: "Paper; Semi-flexible bimetal-based thermal energy harvesters" Smart Materials and Structures, Iop Publishing Ltd., Bristol, GB, vol. 22, N° 2.

* cited by examiner

DEVICE FOR CONVERTING THERMAL POWER INTO ELECTRIC POWER

PRIORITY CLAIM

This application claims the priority benefit of French Patent application number 1357913, filed on Aug. 9, 2013, the contents of which is hereby incorporated by reference in its entirety to the maximum extent allowable by law.

TECHNICAL FIELD

The present disclosure relates to a device for converting thermal power into electric power, or thermoelectric generator.

BACKGROUND

A device capable of converting thermal power into electric power by means of a curved bimetal strip which changes shape in variable temperature conditions, in combination with a capacitive electret transducer, is disclosed in article "Semi-flexible bimetal-based thermal energy harvesters" by Sébastien Boisseau et al., Smart Materials and Structures, Volume 22, Number 2, 2013, the disclosure of which is incorporated by reference.

It would however be desirable to have a simple, compact, and inexpensive device integrating a plurality of conversion cells which operate based on this principle, and which can perform an efficient conversion of thermal power into electric power in a range of different environments.

SUMMARY

To achieve this, an embodiment provides a device for converting thermal power into electric power, comprising a plurality of conversion cells arranged inside and on top of a first substrate, each cell comprising: a curved bimetal strip; and first and second diodes coupled to said strip, arranged in a first semiconductor region of the first substrate.

According to an embodiment, in each cell, the anode of the first diode and the cathode of the second diode are electrically coupled to the strip by at least one first conductive track.

According to an embodiment, the first conductive track is formed in at least one metal level of the bimetal strip.

According to an embodiment, the cathodes of the first diodes are coupled to a same first node of the device by at least one second conductive track, and the anodes of the second diodes are coupled to a same second node of the device by at least one third conductive track.

According to an embodiment, the second and third conductive tracks are formed in at least one metal level of the bimetal strip.

According to an embodiment, each cell comprises a first capacitive electret transducer having a first electrode formed by the strip.

According to an embodiment, in each cell, a second semiconductor region of the first substrate located in front of the strip forms a second electrode of the capacitive electret transducer of the cell.

According to an embodiment, each cell comprises an electret layer between the strip and the second semiconductor region.

According to an embodiment, the device further comprises a second substrate located on the side of the bimetal strips opposite to the first substrate.

According to an embodiment, the second substrate comprises fins on a surface opposite to the bimetal strips.

According to an embodiment, the second substrate is coated with an electret layer on the side of a surface facing the bimetal strips.

According to an embodiment, each cell comprises a second capacitive electret transducer having a first electrode formed by the strip and having a second electrode formed by a semiconductor region of the second substrate located in front of the strip.

According to an embodiment, the first substrate is an SOI substrate comprising a semiconductor layer coating an insulating layer coating a semiconductor support.

According to an embodiment, in each cell, the curved bimetal strip is formed above the insulating layer in a region of the substrate from which the semiconductor layer has been removed.

According to an embodiment, the first and second diodes are formed in the semiconductor layer.

Another embodiment provides a method of manufacturing a device for converting thermal power into electric power, comprising a plurality of conversion cells arranged inside and on top of a first substrate, the method comprising the steps of: forming, in each cell, first and second diodes in a first semiconductor region of the first substrate; and forming, in each cell, a curved bimetal strip coupled to the first and second diodes of the cell.

According to an embodiment, the method further comprises a step of forming, in each cell, an electret layer between the strip and a second semiconductor region, the strip and the second semiconductor region forming electrodes of a capacitive electret transducer of the cell.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION OF THE DRAWINGS

Figure 1:
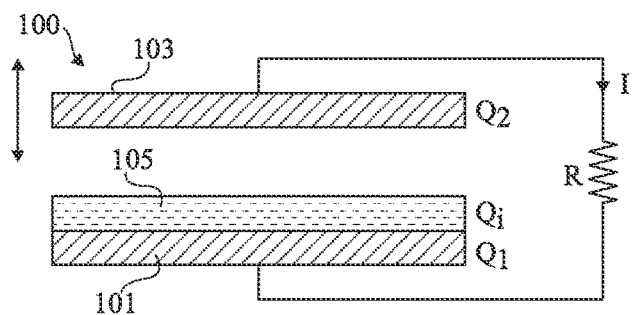
FIG. 1 is a diagram illustrating the operating principle of a capacitive electret transducer.

For clarity, the same elements have been designated with the same reference numerals in the different drawings and, further, the various drawings are not to scale. Further, in the following description, unless otherwise indicated, terms "approximately", "substantially", "around", and "in the order of" mean "to within 10%", and terms referring to directions, such as topping, above, under, upper, lower, vertical, horizontal, lateral, etc. apply to devices arranged as illustrated in the cross-section views of the corresponding drawings, it being understood that, in operation, the devices may have different orientations.

FIG. 1 is a cross-section view schematically illustrating an example of a capacitive electret transducer 100. Transducer 100 comprises an electrode 101 or fixed electrode and, in front of electrode 101, an electrode 103 mobile with respect to fixed electrode 101. In this example, electrodes 101 and 103 are substantially planar and parallel to each other, and electrode 103 is capable of shifting along an axis approximately orthogonal to electrodes 101 and 103. Electrode 101 is coated with an electret sheet or layer 105. Electret here means an electrically-charged dielectric, capable of keeping its charges or a significant part of its charges for a long period, typically in the range from a few years to several tens of years. In the shown example, a load, schematically shown as a resistor R, is connected between electrodes 101 and 103 of transducer 100. Transducer 100 operates as follows.

Electret layer 105, which contains a quantity $Q_i$ of charges of a first polarity for example, negative charges, induces in electrodes 101 and 103 the building up of charges of inverse polarity, positive charges in this example. Calling $Q_1$ the quantity of charges induced in electrode 101 by layer 105, and $Q_2$ the quantity of charges induced in electrode 103 by layer 105, equilibrium $Q_i=Q_1+Q_2$ is respected at any time. A displacement of electrode 103 with respect to electrode 101 causes a reorganization of the charges induced in electrodes 101 and 103 by electret layer 105. In particular, when electrode 103 moves away from electrode 101, quantity $Q_2$ of charges induced in electrode 103 decreases and quantity $Q_1$ of charges induced in electrode 101 increases. Conversely, when electrode 103 moves towards electrode 101, quantity $Q_2$ of charges induced in electrode 103 increases and quantity $Q_1$ of charges induced in electrode 101 decreases. As a result, a current I flows through load R. The relative motion of electrode 103 with respect to electrode 101 is thus converted into electricity.

Figure 2:
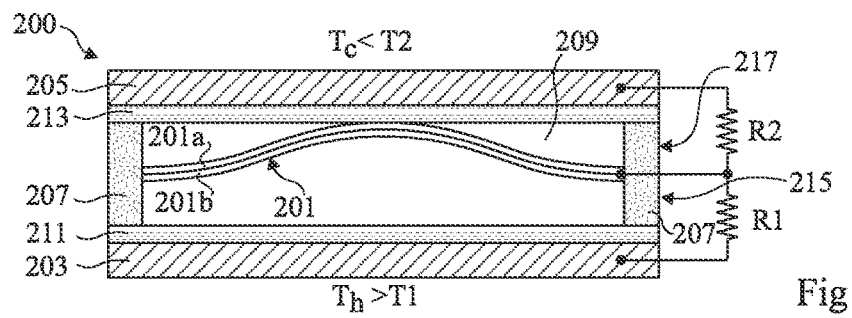
FIG. 2 is a simplified perspective view illustrating an example of a thermoelectric generator using a curved bimetal strip coupled to a capacitive electret transduction system.

FIG. 2 is a simplified perspective view illustrating an example of a device 200 for converting thermal power into electric power comprising a curved bimetal strip coupled to a capacitive electret transduction system.

Device 200 comprises a curved bimetal strip 201, formed of two stacked layers 201a, 201b of distinct metals having different thermal expansion coefficients. Strip 201 is capable of changing shape when its temperature varies. As an example, strip 201 is capable of alternating between a first arch shape (in the orientation of FIG. 2) such as shown in FIG. 2, when its temperature is higher than a threshold T1, and a second inverted arch shape (not shown) (in the orientation of FIG. 2) when its temperature is lower than a threshold T2 lower than threshold T1.

Device 200 further comprises two approximately parallel metal plates or sheets 203 and 205 facing each other. In the orientation of FIG. 2, plates 203 and 205 are approximately horizontal, and plate 205 is above plate 203. Approximately vertical lateral walls 207 made of an electrically-insulating and preferably thermally-insulating material are arranged between plates 203 and 205. Plates 203 and 205 and walls 207 delimit a cavity 209. On the side of their surfaces directed towards the inside of cavity 209, metal plates 203 and 205 are respectively coated with an electret layer 211 and with an electret layer 213. Electret layers 211 and 213 are for example made of charged TEFLON®.

Bimetal strip 201 is arranged inside of cavity 209. In this example, strip 201 is suspended by its ends between metal plates 203 and 205, for example, approximately at mid-height of walls 207.

Metal plate 203, electret layer 211, and bimetal strip 201 form a first capacitive electret transducer 215. Plate 203 and strip 201 for example respectively correspond to the fixed electrode and to the mobile electrode of a transducer of the type described in relation with FIG. 1. In the shown example, a load, schematically shown as a resistor R1, is connected between electrodes 203 and 201 of transducer 215. Further, metal plate 205, electret layer 213, and bimetal strip 201 form a second capacitive electret transducer 217. Plate 205 and strip 201 for example respectively correspond to the fixed electrode and to the mobile electrode of a transducer of the type described in relation with FIG. 1. In the shown example, a load, schematically shown as a resistor R2, is connected between electrodes 205 and 201 of transducer 217.

In operation, metal plate 203 is intended to be in contact with a hot source at a temperature $T_h$ higher than threshold T1, and metal plate 205 is intended to be in contact with a cold source at a temperature $T_c$ lower than threshold T2. The hot source may be a surface of an electronic component, or any other heat source available in the environment, for example, a car exhaust pipe, a duct, a wall of a machine, etc. The cold source may be a fin-type radiator, or directly the ambient air, or any other source having a temperature lower than that of the hot source.

When strip 201 is in its inverted arch shape, strip 201 is in contact or in the immediate vicinity of electret layer 211. Heat generated by the hot source is then transmitted to strip 201 via plate 203 and layer 211. When the temperature of strip 201 reaches threshold T1, strip 201 takes its arch shape. Strip 201 thus moves away from the hot source and comes into contact or in the immediate vicinity of electret layer 213. Strip 201 then cools down due to its proximity to the cold source. When the temperature of strip 201 reaches threshold T2, the strip recovers its inverted arch shape, and the cycle resumes. Thermal power generated by the hot source is thus converted into mechanical oscillations of strip 201. During such oscillations, mobile electrode 201, common to transducers 215 and 217, alternately draws away and moves towards fixed electrodes 203 and 205, which creates electric currents in loads R1 and R2. Mechanical power generated by the oscillations of strip 201 is thus converted into electric power.

In certain applications, it would be desirable to have a simple, compact and inexpensive thermoelectric generator integrating a plurality of conversion cells of small dimensions which operate based on a conversion principle identical or similar to that described in relation with FIG. 2.

A difficulty is that, in practice, to be able to use in conventional applications the electric power generated by a generator of the type described in relation with FIG. 2, the generator should comprise a circuit (not shown in FIG. 2) for converting the electric signals provided by each capacitive electret transducer into power usable to supply conventional loads. Examples of such conversion circuits are described in above-mentioned article "Semi-flexible bimetal-based thermal energy harvesters", which is incorporated herein by reference to the maximum extent allowable by law. When the generator comprises a plurality of conversion cells operating in parallel, the circuit for converting the electric signals provided by the capacitive electret transducers may be relatively complex and bulky.

Figure 3:
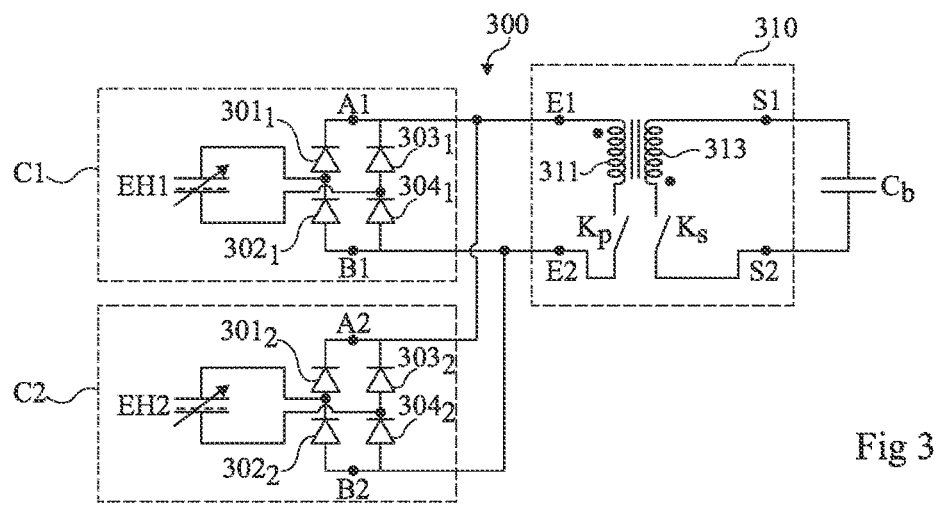
FIG. 3 is an electric diagram of an example of thermoelectric generator.

FIG. 3 is an electric diagram of an example of a thermoelectric generator 300 using a plurality of curved bimetal strips coupled to capacitive electret transducers. FIG. 3 more particularly illustrates an embodiment of a circuit for converting the electric power provided by the capacitive electret transducers, for its use to power a load.

Generator 300 comprises a plurality of thermoelectric conversion cells, two cells C1 and C2 in the shown example, each comprising a thermoelectric transduction element, respectively EH1 in cell C1 and EH2 in cell C2. In each cell C1, C2, thermoelectric transduction element EH1, EH2 is for example an alternative embodiment of the device of FIG. 2 where bimetal strip 201 is only coupled to a single capacitive electret transducer, that is, where a single one of the two fixed metal plates 203, 205 is coated with an electret layer. Each cell C1, C2 further comprises a circuit for rectifying the electric signals provided by thermoelectric transduction element EH1, EH2 of the cell. In the shown example, in each cell C1, C2, the rectifying circuit is formed by a diode bridge. In cell C1, the rectifying circuit comprises: a first diode $301_1$ forward-connected between a first electrode—the mobile electrode in this example—of element EH1 and a node A1; a second diode $302_1$ forward-connected between a node B1 and the anode of diode $301_1$; a third diode $303_1$ forward-connected between a second electrode—the fixed electrode in this example—of element EH1 and node A1; and a fourth diode $304_1$ forward-connected between node B1 and the anode of diode $303_1$. In cell C2, the rectifying circuit comprises: a first diode $301_2$ forward-connected between a first electrode—the mobile electrode in this example—of element EH1 and a node A2; a second diode $302_2$ forward-connected between a node B2 and the anode of diode $301_2$; a third diode $303_2$ forward-connected between a second electrode—the fixed electrode in this example—of element EH1 and node A2; and a fourth diode $304_2$ forward-connected between node B1 and the anode of diode $303_2$. In cell C1, respectively C2, nodes A1 and B1, respectively A2 and B2, define output nodes of the cell and provide, in operation, rectified electric signals.

In the example of FIG. 3, the outputs of the different cells are coupled, in parallel, to the input of a single power converter 310. In this example, converter 310 comprises a DC-DC transformer comprising a first winding 311, or primary winding, series-coupled with a switch $K_P$ between input nodes E1 and E2 of converter 310, and a second winding 313, or secondary winding, series-coupled with a switch $K_S$ between output nodes S1 and S2 of converter 310. Windings 311 and 313 may be magnetically coupled and have, in this example, opposite winding directions. In this example, output nodes A1, A2 of cells C1, C2 are connected to input node E1 of converter 310, and output nodes B1, B2 of cells C1, C2 are connected to input node E2 of converter 310. A control circuit, not shown, enables to control switches $K_P$ and $K_S$ to transfer electric power from the input to the output of converter 310. An element CB for storing the electric power provided by converter 310, for example, a battery or a capacitor, may be coupled to output terminals S1, S2 of converter 310.

The rectifying circuits of thermoelectric conversion cells C1, C2 and power converter 310 form a circuit for converting the electric power generated by thermoelectric transduction elements EH1, EH2. This circuit may easily be adapted to a generator comprising a number of thermoelectric conversion cells different from two.

To form a thermoelectric generator comprising a high number of thermoelectric conversion cells coupled in parallel, a problem which is posed is that of the bulk of the diodes provided in each cell to rectify the signals provided by the thermoelectric transduction element of the cell and of the high number of wires to be provided to connect, in each cell, the thermoelectric transduction element to the diodes, and to interconnect the diodes to the different cells. This results in a bulky and complex structure. Further, the steps of manufacturing the different conversion cell and of assembling these cells in a generator are relatively long and complex.

An aspect of an embodiment provides a thermoelectric generator comprising a plurality of thermoelectric conversion cells integrated inside and on top of a same substrate, each cell comprising a bimetal strip and at least two diodes formed in a semiconductor region of the substrate.

As will more clearly appear from the following description, this provides a simple and compact device which is relatively easy and inexpensive to form since it only requires tried and tested methods and/or equipment for manufacturing electronic components inside and on top of substrates comprising semiconductor regions.

Figure 4A:
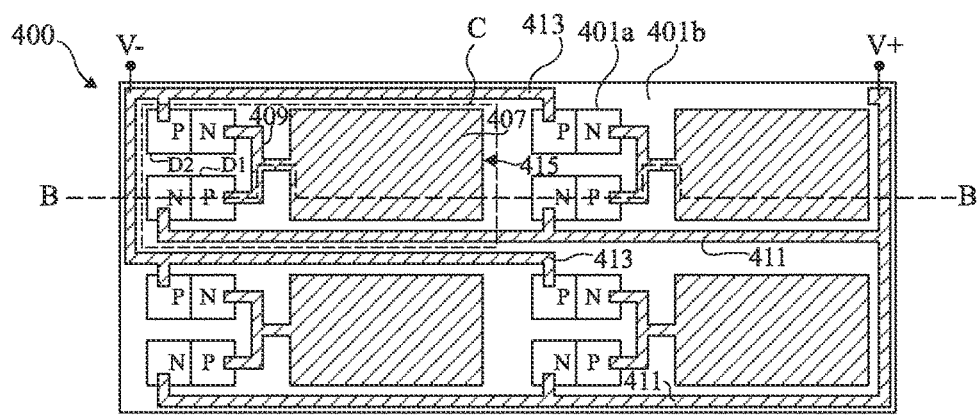
FIGS. 4A to 4C schematically illustrate an embodiment of a thermoelectric generator.
Figure 4B:
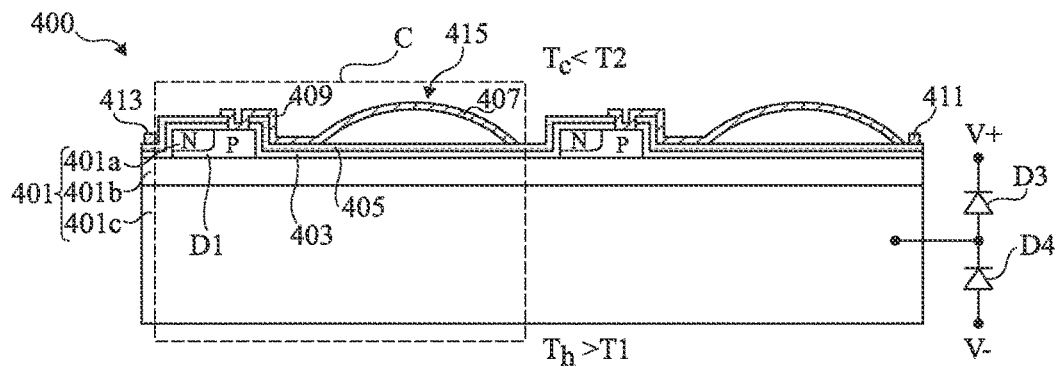
Figure 4C:
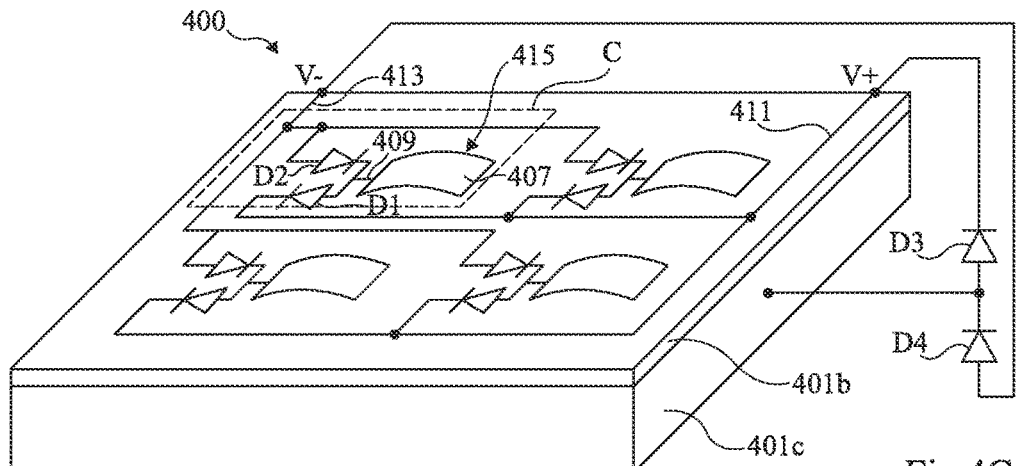

FIGS. 4A to 4C illustrate an example of an embodiment of a thermoelectric generator 400. FIG. 4A is a top view of generator 400, FIG. 4B is a cross-section view of generator 400 along line B-B of FIG. 4A, and FIG. 4C is a simplified perspective view of generator 400.

Generator 400 comprises a plurality of identical or similar thermoelectric conversion cells C formed inside and on top of a substrate 401. In FIGS. 4A to 4C, four cells have been shown. However, in practice, generator 400 may comprise a different number of cells, for example, a much higher number of cells, for example approximately from 10 to 1,000,000 cells on an approximately circular substrate having a diameter in the range from 100 to 450 mm. In this example, the cells are arranged in an array. The described embodiments are however not limited to this specific layout.

In the example of FIGS. 4A to 4C substrate 401 is a substrate of semiconductor-on-insulator type SOI, comprising a semiconductor layer 401a, for example, made of silicon, coating an insulating layer 401b, for example, made of silicon oxide, layer 401b itself coating a semiconductor support 401c, for example, made of silicon. As an example, support 401c has a thickness in the range from 50 to 1,000 µm, insulating layer 401b has a thickness in the range from 0.01 to 5 µm, and semiconductor layer 401a has a thickness in the range from 0.01 to 5 µm.

Each thermoelectric conversion cell C comprises, in this example, two diodes D1 and D2 formed in a region of semiconductor layer 401a. In the vicinity of diodes D1 and D2, each cell C comprises a portion of substrate 401 from which layer 401a has been removed. In this example, an insulating layer 403, for example, made of silicon nitride ($Si_3N_4$), coats the upper surface of the portions of layer 401b left exposed by the removal of layer 401a, as well as the upper surface and the lateral surfaces left exposed by the removal of layer 401a, of regions of layer 401a where diodes D1 and D2 are formed. Layer 403 is itself coated with an electret layer 405, for example made of charged TEFLON® or of charged parylene. As a variation layer 405 may be made of hexamethyldisiloxane, generally called HMDS in the art. It should be noted that HMDS does not intrinsically have electret properties, but the performed tests have shown that, after deposition of a HMDS layer 405, the oxide-nitride-HMDS stack of layers 401b-403-405 has electret properties, that is, it may hold electric charges for a long period. More generally, electret layer 405 may be made of any material having electret properties alone or in combination with layers 401b and 403. As an example, layer 403 has a thickness in the range from 10 to 500 nm and layer 405 has a thickness in the range from 1 nm to 2 μm. Layers 403 and 405 comprise openings enabling to take electric contacts on the anode and cathode regions of diodes D1 and D2. To simplify the drawings, layers 403 and 405 are not shown in FIGS. 4A and 4C. Further, in FIG. 4C, semiconductor layer 401a is not shown and diodes D1 and D2 are schematically shown by electronic symbols.

Each conversion cell C comprises a curved bimetal strip 407 located above the portion of substrate 401 close to diodes D1 and D2 from which semiconductor layer 401a has been removed. In the shown example (see FIG. 4B), bimetal strip 407 is supported by electret layer 405. Strip 407 comprises two stacked layers of distinct metal having different thermal expansion coefficients. However, to simplify the drawings, the two metal layers are not differentiated in the drawings. Strip 407 is capable of changing shape when its temperature varies. As an example, strip 407 is capable of alternating between a first arch shape (in the orientation of FIG. 4B) as shown in FIGS. 4B and 4C, when its temperature is higher than a threshold T1, and a second inverted arch shape (not shown) (in the orientation of FIG. 4B) when its temperature is lower than a threshold T2 lower than threshold T1. The metal of each layer of strip 407 is for example selected from among titanium nitride, aluminum, copper, iron, gold, tungsten, platinum, an iron-nickel alloy, or an alloy of any of these metals. Each of the two metal layers of strip 407 for example has a thickness in the range from 0.1 to 10 μm. As an example, in top view, strip 407 is approximately rectangular. Strip 407 for example has a width in the range from 1 to 500 μm and a length in the range from 10 to 5,000 μm. The described embodiments are however not limited to this specific shape and to these dimensions. It should be noted that the surfaces of strip 407 may be coated with an insulating layer, not shown, for example, made of parylene of TEFLON® or HMDS, to avoid a direct contact between the metal of the strip and the electret, which might damage the electret and especially discharge it. As an example, the insulating coating may have a thickness in the range from 1 nm to 5 μm.

In each cell C, bimetal strip 407 is electrically coupled, for example, connected, to the anode region of diode D1 and to the cathode region of diode D2 by at least one metal track 409. Track 409 is preferably formed in one of the metal levels of strip 407 or in the two metal levels of strip 407. This enables to simplify the structure of generator 400 and to make it easier to form while saving metal levels.

In this example, the cathode regions of diodes D1 of the different cells C of generator 400 are electrically coupled, for example, connected, to a same node V+ by at least one metal track 411, and the anode regions of diodes D2 of the different cells C of generator 400 are electrically coupled, for example, connected, to a same node V− by at least one metal track 413. Tracks 411, 413 are preferably formed in one of the metal levels of strips 407 or in the two metal levels of strips 407.

As appears in FIGS. 4B and 4C, in this example, generator 400 further comprises two diodes D3 and D4 series-connected between nodes V− and V+, the anode of diode D4 being electrically coupled, for example, connected, to node V− and the cathode of diode D3 being electrically coupled, for example, connected, to node V+. The anode region of diode D3 and the cathode region of diode D4 (junction point of diodes D3 and D4) are electrically coupled, for example, connected, to semiconductor support 401c of substrate 401.

As an example, diodes D3 and D4 may be formed in a region of semiconductor layer 401a of substrate 401. In this case, to connect the anode region of diode D3 and the cathode region of diode D4 to support 401c, it may be provided to form an opening (not shown) in insulating layer 401b to access the upper surface of support 401c, and to form at least one conductive track connecting the upper surface of support 401c to the anode of diode D3 and to the cathode of diode D4. This track may be formed in one of the metal levels of strips 407 or in the two metal levels of strips 407.

As a variation, diodes D3 and D4 may be discrete diodes. In this case, to connect the anode of diode D3 and the cathode of diode D4 to support 401c, it may be provided to form a contact metallization (not shown) either on the upper surface of support 401c, in an opening (not shown) crossing insulating layer 401b, or on the lower surface of support 401c. The anode of diode D3 and the cathode of diode D4 may be connected to this metallization by conductive wires.

In each thermoelectric conversion cell C of generator 400, the portion of support 401c located under bimetal strip 407, electret layer 405, and bimetal strip 407 form a capacitive electret transducer 415. Support 401c and strip 407 for example respectively correspond to the fixed electrode and to the mobile electrode of a transducer of the type described in relation with FIG. 1.

In operation, the lower surface or back side of support 401c is intended to be in contact with a hot source at a temperature $T_h$ higher than threshold T1, and the upper surface of generator 400 is intended to be in contact with a cold source at a temperature $T_c$ lower than threshold T2, for example ambient air.

In each cell C, thermal power generated by the hot source is converted into mechanical oscillations of strip 407 of the cell, and mechanical power generated by the strip oscillations is converted into electric power by transducer 415 of the cell, according to a principle similar to that described in relation with FIG. 2. In each cell, diodes D1 and D2 of the cell form, with diodes D3 and D4 common to all cells of the generator, a diode bridge capable of rectifying the electric signals generated by transducer 415 of the cell.

Generator 400 may further comprise a circuit, not shown, for converting the rectified electric signals provided between nodes V− and V+. As an example, a conversion circuit such as circuit 310 of FIG. 3 may be connected, by its input nodes E1, E2, to output nodes V+, V− of the rectifying circuit of generator 400. More generally, any other circuit capable of converting the rectified electric signals provided between nodes V− and V+ into electric power usable to supply a load may be used.

FIGS. 5A to 5F are cross-section views schematically illustrating steps of an example of a method of manufacturing a thermoelectric generator of the type described in relation with FIGS. 4A to 4C.

Figure 5A:
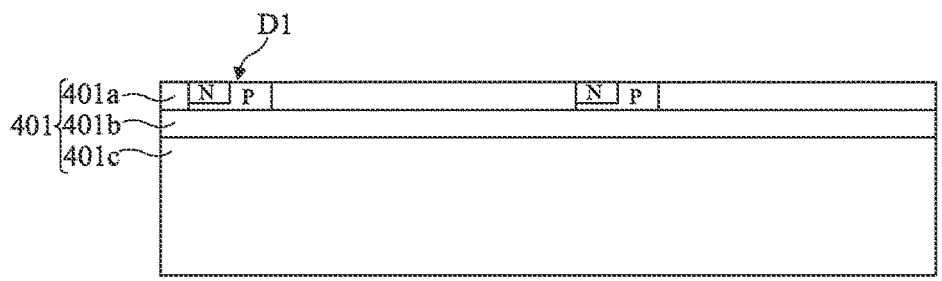
FIGS. 5A to 5F are cross-section views schematically illustrating steps of an example of a method of manufacturing a thermoelectric generator of the type described in relation with FIGS. 4A to 4C.

FIG. 5A illustrates a step of forming diodes D1 and D2 of cells C in semiconductor 401a layer of substrate 401. To achieve this, N-type and P-type dopant elements may be implanted or diffused into layer 401a from its upper surface. Masks, not shown, may be used to delimit the implantation regions.

Figure 5B:
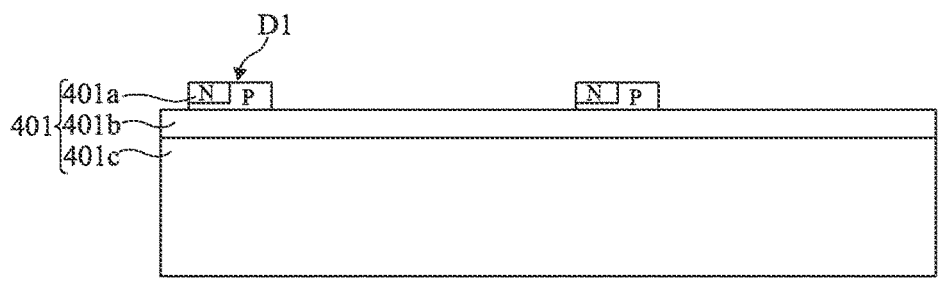

FIG. 5B illustrates a step of removal, from each cell C, of at least a portion of layer 401a in a region of substrate 401 close to diodes D1 and D2 of the cell. As an example layer 401a may be removed everywhere except where diodes D1, D2 have been formed. It should be noted that a portion of layer 401a may be removed between diode D1 and diode D2 of each cell, which enables to isolate the diodes from one another. Layer 401*a* may be removed by etching. A mask, not shown, may be used to delimit the areas of layer 401*a* to be etched.

Figure 5C:
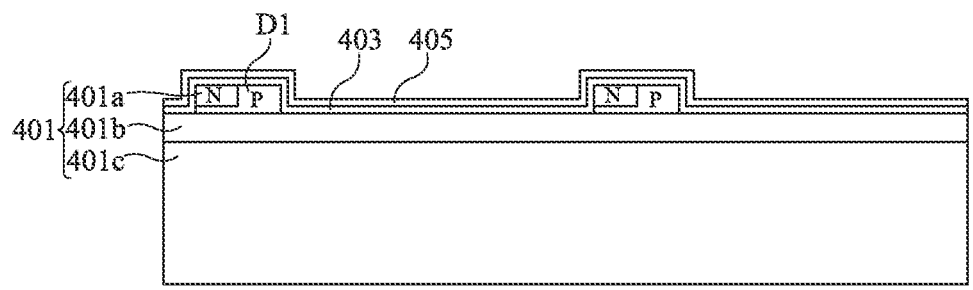

FIG. 5C illustrates a step subsequent to the etching step of FIG. 5B, of deposition of insulating layer 403 on the upper surface of substrate 401, that is, on the upper surfaces of layer 401*b* left free by the etching of layer 401*a*, and on the lateral and upper surfaces of the non-etched regions of layer 401*a*. FIG. 5C further illustrates the deposition, on the upper surface of layer 403, of a layer 405 of a material capable of being used as an electret, alone or in combination with layers 401*b* and 403 for example TEFLON®, parylene, or HMDS.

Figure 5D:
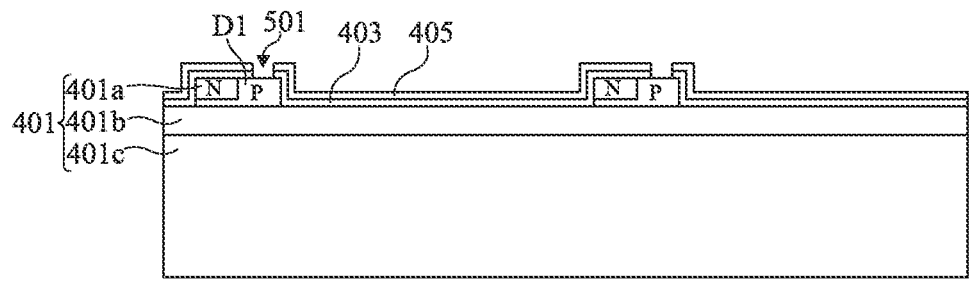

FIG. 5D illustrates a step of forming openings 501 in the stack formed by layers 403 and 405, in front of regions for contacting the anode and cathode regions of diodes D1 and D2 of cells C. To improve the electric contact, an optional step of siliciding the exposed silicon may be provided, to form, for example, a nickel silicide layer on the anode and cathode regions of diodes D1 and D2.

Figure 5E:
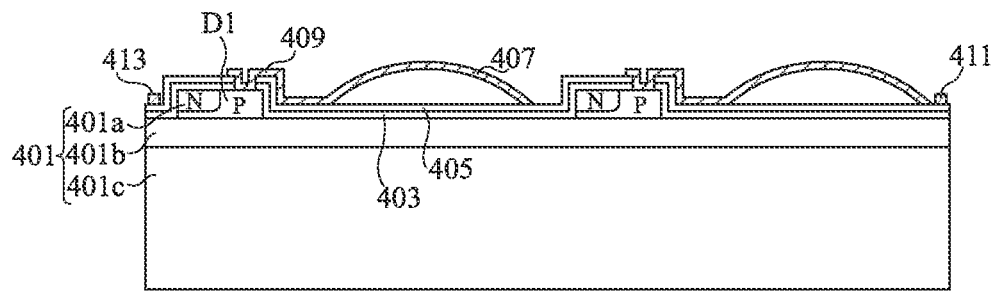

FIG. 5E illustrates a step of forming, in each cell C, a curved bimetal strip 407 above layer 405, in a region of the substrate where layer 401*a* has been removed in the vicinity of diodes D1 and D2. Strips 407 may for example be formed by a method of the type described in French patent application entitled "Plaque incurvée et son procédé de fabrication" filed on Apr. 2, 2012 under Ser. No. 12/529,97, and in the corresponding US patent application filed on Mar. 28, 2013 under Ser. No. 13/852,676. The two applications are incorporated herein by reference to the maximum extent allowable by law.

As an example, square or rectangular blocks (not shown) of a phase-change material such as resin are formed on layer 405 where strips 407 are desired to be formed. A photolithography step may be provided to form the blocks. After the blocks have been formed, an annealing may be provided to transform the blocks into rounded mounds (not shown) having a more or less spherical shape depending on the anneal conditions. After the annealing, two layers of distinct materials having different thermal expansion coefficients may be successively deposited on the rounded mounds to form curved strips 407. The metal depositions may for example be performed by a physical vapor deposition method. After the metal layers have been deposited, an etching step may be provided to delimit strips 407 and, possibly, conductive tracks 409, 411, 413. The mounds of the phase-change material used to shape the strips can then be removed, for example, by wet etching.

After removal of the mounds of phase-change material, the upper and lower surfaces of strips 407 may be coated with an insulating layer aiming at avoiding a direct contact between the metal of the strip and the electret of the transducer. Such a layer is for example formed by conformal deposition of an insulating material over the entire surface of the device, for example, a polymer such as parylene, TEFLON®, or HMDS.

Figure 5F:
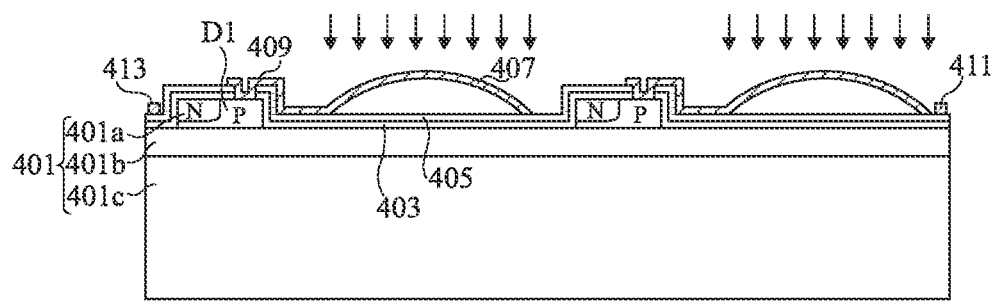

FIG. 5F illustrates a step during which layer 405 is electrically charged to acquire electret properties. In this example, layer 405 is submitted, to achieve this, to a Corona discharge, for example under a peak voltage in the order of 10,000 volts for approximately 1 hour. In the shown example, the Corona discharge is performed through bimetal strips 407. The described embodiments are however not limited to this specific case. It may for example be provided to implement the Corona discharge before forming strips 407. Further, it may be provided to electrically charge layer 405 by other means than by a Corona discharge. It should be noted that in the shown example, an advantage linked to the use of an SOI substrate is that, during the Corona discharge, charges are stored not only in layer 405, but also in the underlying dielectric layers, and especially in layer 401*b* of the substrate which may contain a relatively large amount of charges. In the absence of upper layer 405, layer 401*b* could not retain electric charges for a sufficiently long period to be used as an electret. However, the presence of upper layer 405, for example, made of TEFLON® or of parylene, prevents the discharge of layer 401*b*, whereby layer 401*b* also behaves as an electret in the thermoelectric generator of FIGS. 4A to 4C. For the same reason, layer 403 is also capable of being used as an electret in the generator of FIGS. 4A to 4C.

Figure 6:
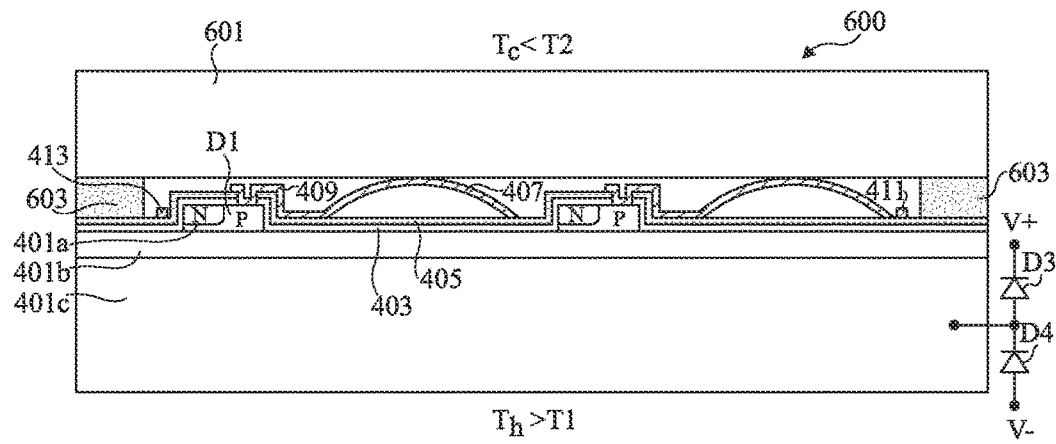
FIGS. 6, 7, and 8 are cross-section views illustrating alternative embodiments of the thermoelectric generator described in relation with FIGS. 4A to 4C.

FIG. 6 is a cross-section view illustrating an alternative embodiment of a thermoelectric generator. Thermoelectric generator 600 of FIG. 6 comprises all the elements of generator 400 of FIGS. 4A to 4C. These elements will not be described again hereafter. Generator 600 further comprises a second substrate 601 which encapsulates the generator on its upper surface side. Substrate 601 may be a semiconductor substrate, for example, a solid silicon substrate, or a substrate of another type. Substrate 601 is arranged above the upper surface of substrate 401, approximately parallel to substrate 401, and is separated from the upper surface of substrate 401 by one or a plurality of spacers 603, for example, made of resin, to leave strips 407 free to deform when their temperature varies.

In operation, the lower surface or back side of support 401*c* is intended to be in contact with a hot source at a temperature $T_h$ greater than threshold T1, and the upper surface of substrate 601 is intended to be in contact with a cold source at a temperature $T_c$ lower than threshold T2.

An advantage of generator 600 of FIG. 6 is that substrate 601 enables to protect the bimetal strips of the generator. Further, substrate 601 enables to more homogeneously transmit the temperature from the cold source to bimetal strips 407.

Figure 7:
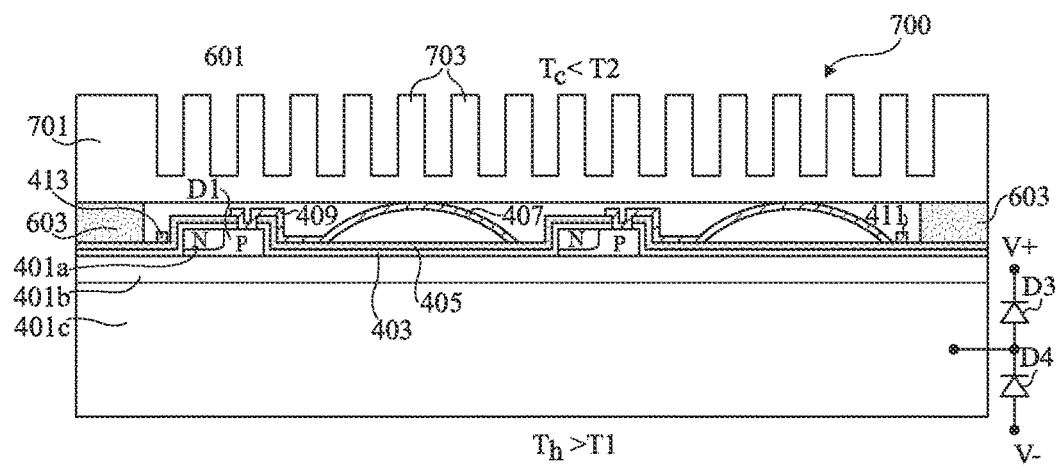

FIG. 7 is a cross-section view illustrating another alternative embodiment of a thermoelectric generator. Thermoelectric generator 700 of FIG. 7 comprises, as in the example of FIG. 6, a substrate 701 forming a cap for protecting bimetal strips 407 on the upper surface side of the generator. Generator 700 of FIG. 7 differs from generator 600 of FIG. 6 in that, in generator 700, the upper surface of substrate 701, that is, the surface of substrate 701 opposite to strips 407, comprises fins 703. Fins 703 may be made of the same material as the substrate. Fins 703 enable to improve the cooling of bimetal strips 407 by the cold source.

Figure 8:
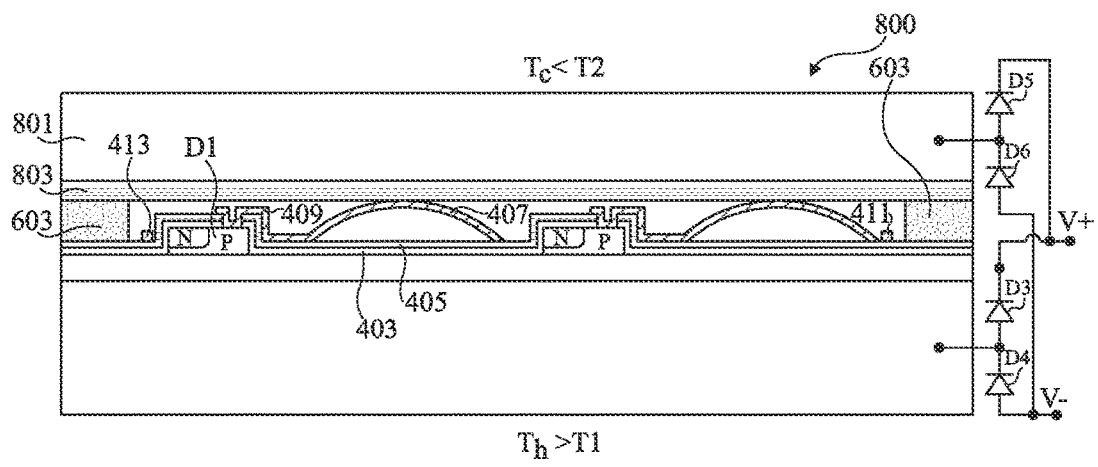

FIG. 8 is a cross-section view illustrating another alternative embodiment of a thermoelectric generator. Thermoelectric generator 800 of FIG. 8 comprises, as in the example of FIG. 6, a substrate 801 forming a cap for protecting strips 407 on the upper surface side of the generator. In generator 800, substrate 801 is a semiconductor substrate, for example, a solid silicon substrate. Generator 800 of FIG. 8 differs from generator 600 of FIG. 6 in that, in generator 800, the lower surface of substrate 801, that is, the surface of substrate 801 facing strips 407, is coated with an electret layer 803, for example, an electrically-charged layer of TEFLON® or of parylene, or an electrically-charged stack of one or a plurality of dielectric layers, for example, $SiO_2/Si_3N_4$, and of a layer capable of transforming the dielectric stack into electret, for example, a layer of TEFLON®, parylene, or HMDS. Generator 800 further comprises two diodes D5 and D6 in series between nodes V− and V+, the anode of diode D6 being coupled, for example, connected, to node V− and the cathode of diode D5 being coupled, for example, connected, to node V+. The anode of diode D5 and the cathode of diode D6 (junction point of diodes D5 and D6) are coupled, for example connected, to substrate 801. As an example, diodes D5 and D6 may be discrete diodes. In this case, the anode of diode D5 and the cathode of diode D6 may be connected to substrate 801 via conductive wires and a metallization (not shown) formed on the upper surface or on the lower surface of substrate 801.

An advantage of generator 800 of FIG. 8 is that each thermoelectric conversion cell comprises two capacitive electret transducers sharing a same mobile electrode formed by bimetal strip 407. Thus, each cell operates according to a principle identical or similar to that described in relation with FIG. 2. In this example, semiconductor support 401c forms the fixed electrode of the lower transducer, and substrate 801 forms the fixed electrode of the upper transducer. This enables, for a given quantity of thermal power received by the cell, to recover a larger quantity of electric power.

In an alternative embodiment, each conversion cell may comprise only the upper capacitive electret transducer formed by bimetal strip 407, electret layer 803, and substrate 801. Diodes D3 and D4, as well as layers 403 and 405, can then be suppressed.

It should be noted that the alternative embodiments of FIGS. 7 and 8 may be combined, that is, in generator 800 of FIG. 8, the upper surface of substrate 801, that is, the surface of substrate 801 opposite to strips 407, may comprise fins.

An advantage of the embodiments described in relation with FIGS. 4A to 4C, 6, 7, and 8 is that the described thermoelectric generators are simple, compact, and that they can be manufactured at a large scale at relatively low costs. Further, they may have various surface areas, for example, from the size of a semiconductor chip from a few $mm^2$ to a few $cm^2$, to surface areas of several hundreds of $cm^2$, and relatively low thicknesses, for example, of a few millimeters. Thus, the described generators can efficiently convert thermal power into electric power in various environments.

Specific embodiments have been described. Various alterations, modifications, and improvements will readily occur to those skilled in the art.

In particular, the described embodiments are not limited to the above-mentioned examples where the conversion cells of the thermoelectric generator are formed inside and on top of an SOI substrate. As a variation, a thermoelectric generator of the above-described type may be formed from a solid semiconductor substrate, for example, made of silicon, diodes D1 and D2 of each cell being then formed in the solid semiconductor substrate.

Further, the described embodiments are not limited to the above-mentioned examples of circuits for rectifying the electric signals generated by the thermoelectric transduction elements of the generator. In addition to diodes D1 and D2, each conversion cell may comprise other components formed inside and on top of a semiconductor region of the substrate. Further, above-mentioned diodes D3, D4, D5, D6 are optional and may be replaced with other components completed by other components, or suppressed.

Further, the described embodiments are not limited to the example of a thermoelectric generator manufacturing method described in relation with FIGS. 5A to 5F.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for converting thermal power into electric power, comprising:
   a plurality of conversion cells arranged inside and on top of a first substrate, wherein each cell comprises:
      a curved bimetal strip; and
      a first diode and a second diode coupled to said strip and formed in a first semiconductor region of the first substrate.

2. The device of claim 1, wherein, in each cell, an anode of the first diode and a cathode of the second diode are electrically coupled to the strip by at least one first conductive track.

3. The device of claim 2, wherein said at least one first conductive track is formed in at least one metal level of the bimetal strip.

4. The device of claim 1, wherein the cathodes of the first diodes are coupled to a same first node by at least one second conductive track, and wherein the anodes of the second diodes are coupled to a same second node by at least one third conductive track.

5. The device of claim 4, wherein said at least one second and at least one third conductive tracks are formed in at least one metal level of the bimetal strip.

6. The device of claim 1, wherein each cell comprises a first capacitive electret transducer having a first electrode formed by said bimetal strip.

7. The device of claim 6, wherein, in each cell, a second semiconductor region of the first substrate located in front of the bimetal strip forms a second electrode of the capacitive electret transducer of the cell.

8. The device of claim 7, wherein each cell comprises an electret layer between said bimetal strip and the second semiconductor region.

9. The device of claim 1, further comprising a second substrate located on a side of the bimetal strip opposite to the first substrate.

10. The device of claim 9, wherein the second substrate comprises fins on a surface opposite to the bimetal strip.

11. The device of claim 9, wherein the second substrate is coated with an electret layer on a surface facing the bimetal strip.

12. The device of claim 11, wherein each cell comprises a second capacitive electret transducer having a first electrode formed by said bimetal strip and having a second electrode formed by a semiconductor region of the second substrate located in front of said bimetal strip.

13. The device of claim 1, wherein the first substrate is an SOI substrate comprising a semiconductor layer coating an insulating layer coating a semiconductor support.

14. The device of claim 13, wherein, for each cell, the curved bimetal strip is formed above the insulating layer in a region of the substrate from which the semiconductor layer has been removed.

15. The device of claim 13, wherein said first and second diodes are formed in the semiconductor layer.

16. A method of manufacturing a device for converting thermal power into electric power, comprising a plurality of conversion cells arranged inside and on top of a first substrate, the method comprising:
   forming, in each cell, first and second diodes in a first semiconductor region of the first substrate; and
   forming, in each cell, a curved bimetal strip coupled to the first and second diodes of the cell.

17. The method of claim 16, further comprising forming, in each cell, an electret layer between said bimetal strip and a second semiconductor region, the bimetal strip and the second semiconductor region forming electrodes of a capacitive electret transducer of the cell.

18. A device, comprising:
   a first support substrate having an insulating top surface layer;
   semiconductor material patterned and doped on said top surface layer to define a plurality of first diodes and a plurality of second diodes;
   a first electret layer over said top surface layer;
   a plurality of curved bimetal strips, wherein each curved bimetal strip is electrically connected to a corresponding pair of first and second diodes.

19. The device of claim 18, further comprising a second support substrate having a bottom surface facing the plurality of curved bimetal strips.

20. The device of claim 19, further comprising a second electret layer on said bottom surface between the second support substrate and the plurality of curved bimetal strips.

\* \* \* \* \*